Figure 8:
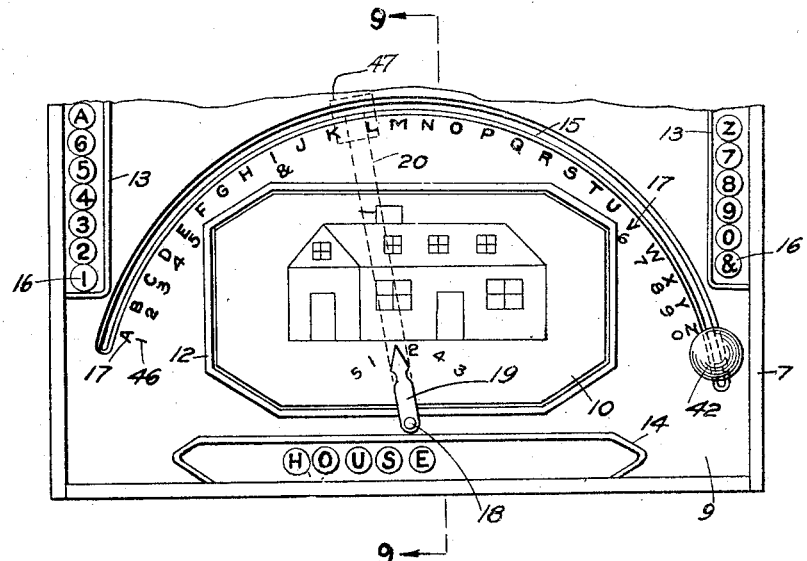

Sept. 7, 1926. 1,599,156
S. WILNIN ET AL
SPELLING TOY
Filed Oct. 23, 1924 3 Sheets-Sheet 1
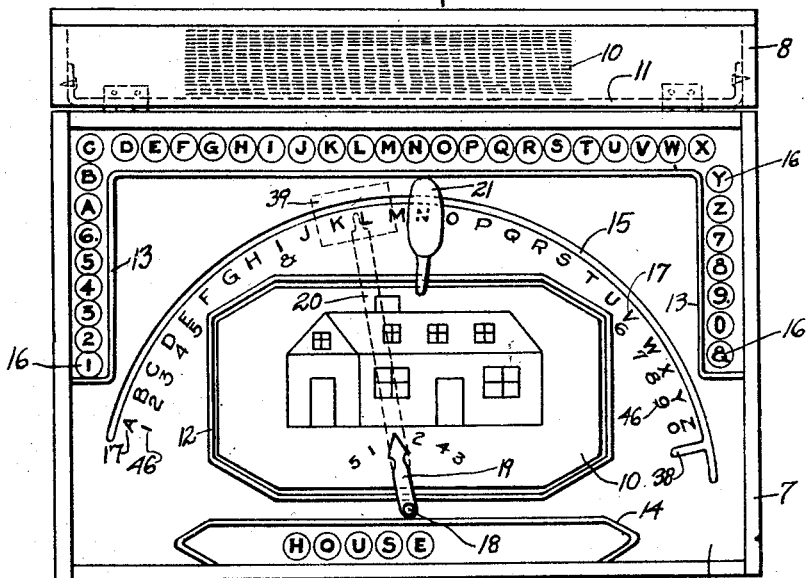
Fig. 1
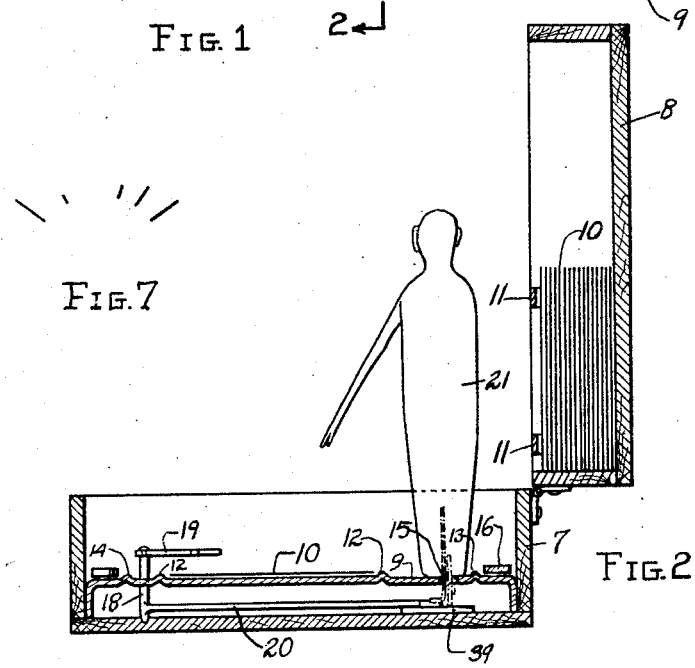
Fig. 7
Fig. 2
Inventors
Samuel Wilnin
William Teichner
By their Attorney Emanuel Scheyer Sept. 7, 1926.  S. WILNIN ET AL  1,599,156
SPELLING TOY
Filed Oct. 23, 1924   3 Sheets-Sheet 2
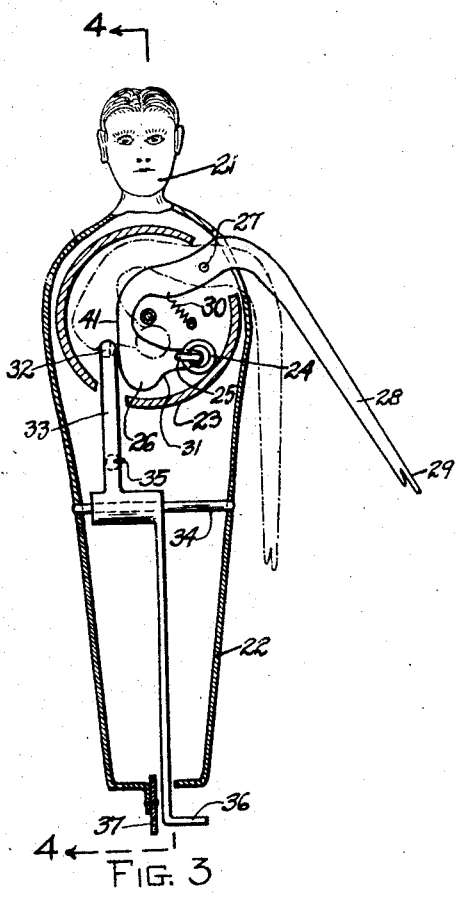
FIG. 3
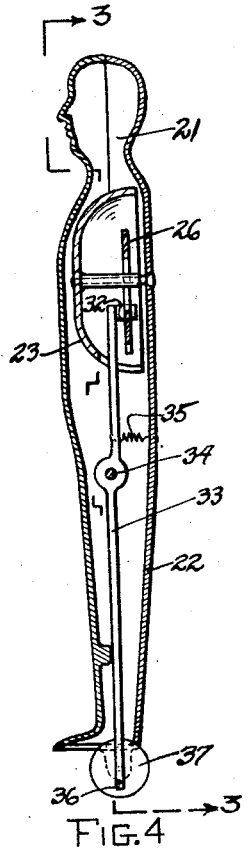
FIG. 4
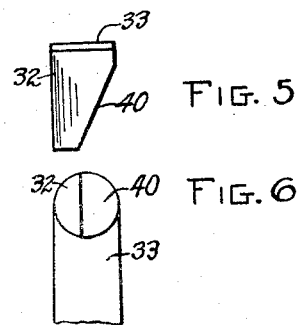
FIG. 5
FIG. 6
Inventors
Samuel Wilnin
William Teichner
By their Attorney
Emanuel Scheyer Patented Sept. 7, 1926.

1,599,156

UNITED STATES PATENT OFFICE.

SAMUEL WILNIN AND WILLIAM TEICHNER, OF NEW YORK, N. Y.

SPELLING TOY.

Application filed October 23, 1924. Serial No. 745,389.

Our invention relates to a toy for teaching young children how to spell. While useful in teaching spelling, it can also be used to teach the answers to various questions, historical, geographical, arithmetical and otherwise.

Our invention has for one of its several objects the teaching of spelling by the use of cards having thereon pictorial representations of the object to be spelled. For the sake of brevity, the subject of spelling will be used throughout in describing and claiming the invention, although it will be understood that other subjects can be treated as well. The card is placed upon a platen preferably of sheet metal suitably embossed with ridges whereby the card is properly allocated thereon. In addition to its picture, the card has printed upon it a set of numerals. The platen is provided with letters radially arranged about a common axis. When the card is properly placed upon the platen, its numerals bear a predetermined relation to certain of the letters, in our preferred form this relation is such that the numerals are substantially on the radial lines of these letters. By means of an indexing device which can be set at the various numerals on the card in their numerical order, an arm is successively brought opposite their corresponding letters. A selective device, in the form of a man with a bell inside is adapted to be moved past the letters, until it strikes the arm, when the bell mechanism is tripped causing the bell to ring. The ringing of the bell indicates to the child that he has reached a letter in the word he is to spell. A number of loose letters are provided which the child picks up, one by one as called for by the man, and sets in a suitable place on the platen until the word is completed. The toy comes mounted in a box with a hinged lid, the main portion of the box holding the platen and indexing mechanism, while the lid is adapted to hold a number of cards with various pictorial representations and numerals.

In the drawings is shown by way of example one construction of the toy according to this invention and:—

Figure 9:
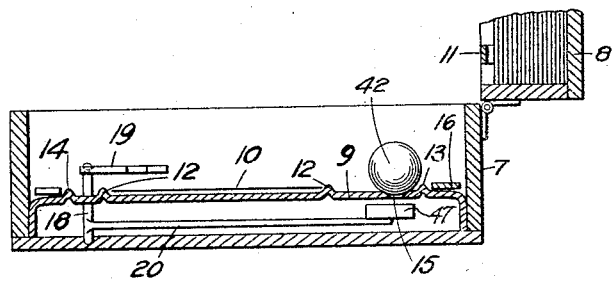

Figure 1 is a plan of the toy with the cover of the box open, Figure 2 is a cross-section taken along the line 2—2 of Figure 1, Figure 3 is a section taken through the figure used as the selective device taken along the line 3—3 of Figure 4, Figure 4 is a section through the selective device taken along the line 4—4 of Figure 3, Figure 5 is a plan view of the upper part of the trip lever, Figure 6 is an elevation of the upper part of the trip lever, Figure 7 shows an alternative set of symbols to be used in selecting the letters of a word, Figure 8 is a partial plan showing an alternative method making use of a ball for selecting the desired letters, and Figure 9 is a partial section along the line 9—9 of Figure 8.

The toy is mounted in a box 7 having a hinged lid 8. The main portion of the box 7 has mounted in it a sheet metal platen 9. Lid 8 carries a plurality of lesson cards 10, one of said cards 10 is also shown lying on the platen 9. Bars 11 are fastened across lid 8 to retain cards 10 in place. Platen 9 is stamped so that a number of ridges are formed in it. One ridge 12 encloses an area which is adapted to hold the card in a definite position on the platen. Another ridge 13 is provided for conveniently retaining a plurality of movable letters, numbers and symbols 16 in place along the edge of the platen 9. Still another ridge 14 is used for blocking off a space in which the movable letters, etc. are placed when picked from the area bounded by ridge 13 as will be explained later on.

When it is desired, say, to teach the subject of spelling, each card 10 is provided with a picture of an object whose name is to be spelled. The particular card 10, shown in Figure 1, is provided with the picture of a house. Below this picture on the card 10 are the numerals, 5, 1, 2, 4, 3 which correspond as will be explained, if taken in numerical order, with the letters H, O, U, S, E of the row of letters 17 printed on the platen 9 near slot 15.

Running through platen 9 is a pivot pin 18, whose lower end is rotatably mounted in the base of box 7. To the upper end of pin 18 is fastened an index arm 19 adapted to swing past the row of numerals on the card. The lower end of pin 18 carries an arm 20 extending substantially to slot 15. The end of arm 20 near slot 15 carries fastened to it a thin plate of metal 39 adapted to slide over the bottom of box 7.

The numerals 5, 1, 2, 4 and 3 on card 10 are on radial lines joining the letters H, O, U, S, E in row 17 with pin 18 as the center, therefore when index arm 19 is set at 1, arm 20 comes opposite letter H, when arm 19 is set at 2, arm 20 comes opposite letter O, and so on until the entire word house is spelled out. In order to make the successive settings of arm 20 strikingly apparent to the operator, a selective device in the form of a man 21 is used. Figures 3 and 4 show the selective device in detail.

Selective device 21 consists of a shell 22 within which is mounted a bell 23. The striker 24 consists of a ring of metal loosely mounted on hook 25 projecting from bell-crank 26. Bell-crank 26 is pivoted on pin 27 and its outer portion is prolonged into an arm 28 with an index finger 29. Spring 30 normally holds bell-crank 26 so that arm 28 stands out from the selective device 21. When arm 28 is moved into the dotted position shown in Figure 3, the reentrant portion 31 of bell-crank 26 locks with the top pin 32 of trip lever 33. Trip lever 33 is pivoted on a pin 34 and is normally held by spring 35 so that its pin 32 is in the path of bell-crank 26. When pin 32 is locked in portion 31 spring 35 holds it there.

When using selective device 21, the hook 36 at the lower end of trip lever 33 is pushed through slot 38 in platen 9, while wheel 37 enters slot 15. The selective device is then moved along slot 15 until wheel 37 rides upon plate 39. The riding of wheel 37 upon plate 39 has the effect of holding arm 20 against any motion, so that when hook 36 strikes the end of arm 20, said hook is pushed back, pulling pin 32 clear of the bell-crank 26 and tripping same. This causes striker 24 to ring bell 23 and simultaneously arm 28 points out. In order to set selective device 21 for another operation, arm 28 is pushed down causing the vertical edge 41 of bell-crank 26 to press against the inclined face 40 of pin 32 and thereby pushing it out of the way until the reentrant portion 31 comes opposite pin 32. When portion 31 is opposite pin 32 spring 35 pulls trip lever 33 over so that pin 32 enters portion 31 and locks bell-crank 26 in its dotted position (Figure 3).

In operation, a particular card 10 is placed upon platen 9, which by means of ridge 12 holds the card in such position that its numerals are on radial lines with certain of the letters, in the particular case shown the numerals if taken in numerical order being on line with the letters H, O, U, S, E. As explained before, when index arm 19 is set at numeral 1, lower arm 20 comes opposite letter H in row 17. The selective device 21 is then moved along slot 15 from right to left until bell-crank 26 is tripped by arm 20, which tripping will take place at letter H. The operator then picks up the movable letter H from among the movable letters 16 and places it down in the space enclosed by ridge 14. Thus the first letter of the word "House" is obtained. The operator next sets index arm 19 at numeral 2 and then operates selective device 21 again, obtaining thereby letter O which is placed next to the first letter H already in the space enclosed by ridge 14. This operation is repeated until all the letters of the desired word are obtained.

For convenience, the letters in row 17 are on radial lines with the numerals on card 10. An equivalent result can be obtained even if arms 19 and 20 are at an angle with each other instead of being parallel as shown, as long as when index arm 19 is on a numeral on the card a corresponding letter comes opposite arm 20. If hook 36 of selective device 21 were off the center of said device, a perfectly feasible construction, a corresponding offset of arm 20 would be required in order to trip the selective device at the predetermined letter.

Instead of using cards for spelling, historical questions could be answered for more advanced children. For example a card could be used which asked the question "When did Columbus discover America?" In this case the numerals on card 10 would be on line with numerals in row 46, which numerals on the card if followed in numerical order would produce the date 1492. Also the answers to arithmetical problems stated on the cards could be found by the same method.

Instead of using the selective device shown, other means could be used. For example, if arm 20 were magnetized, a hollow steel ball 42 (Figs. 8 and 9) could be rolled along slot 15. It would be stopped when it came over arm 20 by the magnetic force between it and said arm, thereby enabling the proper letter to be selected.

Arm 20 is provided with a magnetized block of iron 47 near its outer end. The edges of slot 15 are beveled to better maintain hollow ball 42 in its path. When ball 42 is given a push, it rolls along slot 15 until it comes over arm 20 and block 47, where it is stopped by the magnetic force. The letter under ball 42 is then the one desired.

Instead of using numerals on the card other symbols might be used which if followed in predetermined order would give the desired result. For example if instead of using the numerals 5, 1, 2, 4, 3 on the card 10 as shown, a series of dashes could be used of varying lengths, as shown in Fig. 7 the shortest dash being the one to set the index arm 19 at first, then setting said arm on the other dashes in accordance as they increase in length. In the particular example given, the longest dash would be shown first, corresponding to the numeral 5, followed then by the shortest dash corresponding to the numeral 1, followed then by the next to shortest dash corresponding to the numeral 2 and so on.

We claim:—

1. A toy for spelling words, comprising means having thereon a plurality of letters and a plurality of symbols, said symbols being arranged in a predetermined relation to said letters, and an indexing device adapted to be set opposite said symbols, said indexing device being adapted to enable the letters corresponding to said symbols to be determined, whereby when said indexing device is set at said symbols in a predetermined succession, the successive letters of a desired word can be determined.

2. A toy comprising a platen having thereon a plurality of letters, a pivotally mounted indexing device, a card having thereon a plurality of numerals, said platen adapted to hold the card upon it in a predetermined position, the letters on said platen and the numerals on said card being so arranged that when the card is held in said predetermined position, that each numeral is on a radial line joining one of said letters with the pivot of said indexing device, whereby the letters corresponding to the numerals can be determined.

3. A toy comprising a platen having thereon a plurality of letters, a card having thereon a plurality of numerals, said platen adapted to hold the card upon it in a predetermined position, a rotatably mounted indexing device having an arm adapted to move over said platen and another arm adapted to move under it, the letters on said platen and the numerals on said card being so arranged that when the card is held in said predetermined position that for each numeral on a line with said upper arm, there is a corresponding letter on a line with said lower arm, whereby said numerals can select predetermined letters.

4. A toy comprising a platen having thereon a plurality of letters, a card having thereon a plurality of numerals, said platen adapted to hold the card in such position that predetermined letters correspond to predetermined numerals, a rotatably mounted indexing device having an arm adapted to move above the platen and opposite said numerals and another arm adapted to move under the platen, and a selective device adapted to be actuated by said lower arm for indicating letters corresponding to the numerals at which said upper arm is set.

5. A toy comprising a platen having thereon a plurality of letters, a card having thereon a plurality of numerals, said platen adapted to hold the card in such position that predetermined letters correspond to predetermined numerals, an indexing device having an arm adapted to move opposite said numerals and a selective device for indicating individual letters, said indexing device adapted to actuate said selective device whereby letters are successively indicated corresponding to the successive numerals at which said arm is set.

6. A toy comprising a platen having thereon a plurality of letters, a card having a plurality of symbols, said platen adapted to hold the card in such position that predetermined letters correspond to predetermined symbols, an indexing device adapted to be set opposite said symbols in predetermined succession and a selective device for indicating individual letters, said indexing device adapted to actuate said selective device whereby letters are successively indicated corresponding to the successive symbols at which said indexing device is set.

7. A toy comprising a platen having marked thereon a plurality of letters, a card having thereon a plurality of numerals and a picture whose title it is desired to spell, said platen adapted to hold the card in such position that predetermined letters correspond to predetermined numerals, the said numerals being placed upon the card in such positions that if selected in numerical order their corresponding letters will spell the desired title and indexing means adapted when set at the successive numerals to enable their corresponding letters to be determined.

8. In a toy of the character described, comprising means having a plurality of letters, a card having thereon a pictorial representation of the word it is desired to spell and a plurality of numerals adapted to correspond to those of said letters which form said word, when said card is placed in predetermined relation to said means, said numerals, if selected in numerical order, corresponding to the successive letters of said word in their proper order.

9. In a toy of the character described, comprising a platen having marked thereon a plurality of letters, another plurality of letters removably mounted upon said platen, a card adapted to be mounted on the platen, having thereon a plurality of numerals, which numerals if selected in numerical order correspond to the successive letters of a word it is desired to spell, thereby indicating to the operator how to pick up the removable letters to form said word.

10. In a toy of the character described comprising a plurality of individually movable letters and a removable card having thereon a plurality of numbers, a platen having marked thereon a plurality of letters, said platen having an enclosed space provided for maintaining said card in such position that predetermined letters correspond to predetermined numerals and another enclosed space provided for holding said movable letters and means adapted when set at the successive numerals of the card to enable their corresponding letters to be determined.

11. A toy comprising a platen having thereon a plurality of letters substantially in a row and a slot in said platen running along said row of letters, a card having thereon a plurality of numerals, said platen adapted to hold the card in such position that predetermined letters correspond to predetermined numerals, an indexing device adapted to be set at the several numerals, said indexing device having a member movable under said platen in accordance with said settings and a selective device adapted to be moved along said slot and to be stopped by said movable member, for indicating when stopped the particular letter corresponding to the numeral at which said indexing device is set at any time.

12. A toy comprising a platen having thereon a plurality of letters substantially in a row and a slot in said platen running substantially parallel to said row, a card having thereon a plurality of numerals, said platen adapted to hold the card in such position that predetermined letters correspond to predetermined numerals, an indexing device adapted to be set at the several numerals, said indexing device having a member movable under said platen in accordance with said settings and a selective device having a mechanism adapted to be tripped when brought into contact with said movable member, said selective device adapted to be moved along said slot for indicating when tripped the particular letter corresponding to the numeral at which said indexing device is set at any time.

13. A toy comprising a platen having thereon a plurality of letters substantially in a row and a slot in said platen corresponding to said row, a card having thereon a plurality of numerals, said platen adapted to hold the card in such position that predetermined letters correspond to predetermined numerals, a rotatably mounted indexing device having a member adapted to move above the platen and opposite said numerals and another member adapted to move under the platen and a selective device adapted to be moved in said slot and to be actuated by said lower member for indicating letters corresponding to the numerals at which said upper arm is set, said lower member carrying a plate near its outer end over which the selective device rides for locking said lower member in its successive settings.

14. A toy as claimed in claim 11, wherein the platen is set in a suitable box and the selective device has a roller at its lower extremity adapted to roll along the floor of said box.

15. A toy as claimed in claim 11, wherein the selective device carries a bell adapted to be rung when the mechanism of the selective device is tripped.

16. A toy as claimed in claim 11, wherein the selective device has an arm adapted to fly outward from its main body when the mechanism of the selective device is tripped, said mechanism adapted to be cocked when said arm is pressed inward again toward said main body.

SAMUEL WILNIN.
WILLIAM TEICHNER.